United States Patent [19]
Rollinson

[11] 3,735,899
[45] May 29, 1973

[54] DISPENSING HOPPER

[76] Inventor: Kenneth Rollinson, P. O. Box 242, Tallulah, La. 71282

[22] Filed: July 23, 1971

[21] Appl. No.: 165,560

[52] U.S. Cl. .................. 222/135, 222/185, 222/368
[51] Int. Cl. ..................... B67d 5/52, B65b 37/00
[58] Field of Search ................... 222/135, 185, 368

[56] References Cited

UNITED STATES PATENTS

| 3,270,921 | 9/1966 | Nadolske et al. | 222/368 X |
| 841,111 | 1/1907 | Bromley | 222/368 X |
| 853,769 | 5/1907 | Caviglia | 222/185 X |
| 1,030,854 | 6/1912 | Percy | 222/368 X |
| 1,537,410 | 5/1925 | Courtney | 222/185 |
| 2,567,282 | 9/1951 | Gardner et al. | 222/135 X |

FOREIGN PATENTS OR APPLICATIONS

| 614,488 | 12/1926 | France | 222/368 |
| 505,272 | 8/1954 | Canada | 222/368 |
| 689,003 | 9/1930 | France | 222/368 |
| 1,317,936 | 1/1963 | France | 222/368 |
| 663,758 | 12/1935 | Germany | 222/185 |

Primary Examiner—Robert S. Ward, Jr.
Attorney—Berman, Davidson and Berman

[57] ABSTRACT

A dispensing hopper for powdered or granulated material having a rotary dispensing valve positioned in its lower end and arranged with a single pocket in one side of the valve which can rotate from a filling position to a dumping position to dump a predetermined measured quantity of material from the hopper. A plurality of hoppers are illustrated as a unit for dispensing varied products.

1 Claim, 4 Drawing Figures

PATENTED MAY 29 1973 3,735,899

INVENTOR.
KENNETH ROLLINSON,
BY
Berman, Davidson & Berman,
ATTORNEYS

DISPENSING HOPPER

BACKGROUND OF THE INVENTION

Field of the Invention

The present invention relates to hopper dispensers for dry granulated or powdered materials.

SUMMARY OF THE INVENTION

A plurality of hoppers are arranged on a common base with space beneath to accept a vessel placed there to receive the dispensed material. A rotary dispensing valve having a single pocket is positioned in the bottom of each hopper to dispense a predetermined measured quantity of the material from the hopper.

The primary object of the invention is to provide a convenient accurate hopper dispenser for powdered and granulated material.

Other objects and advantages will become apparent in the following specification when considered in light of the attached drawings.

DESCRIPTION OF THE PREFERRED EMBODIMENT

Figure 1:
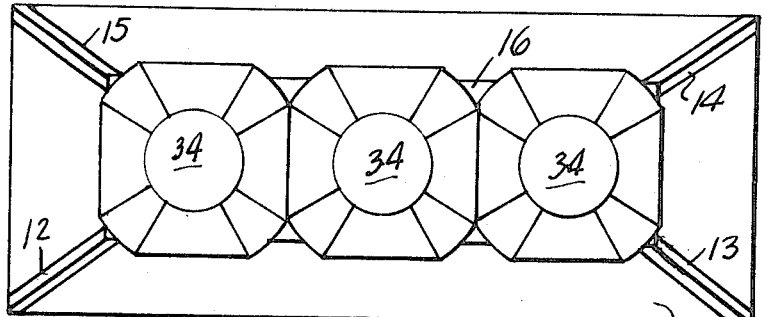
FIG. 1 is a top plan view of the invention.
Figure 2:
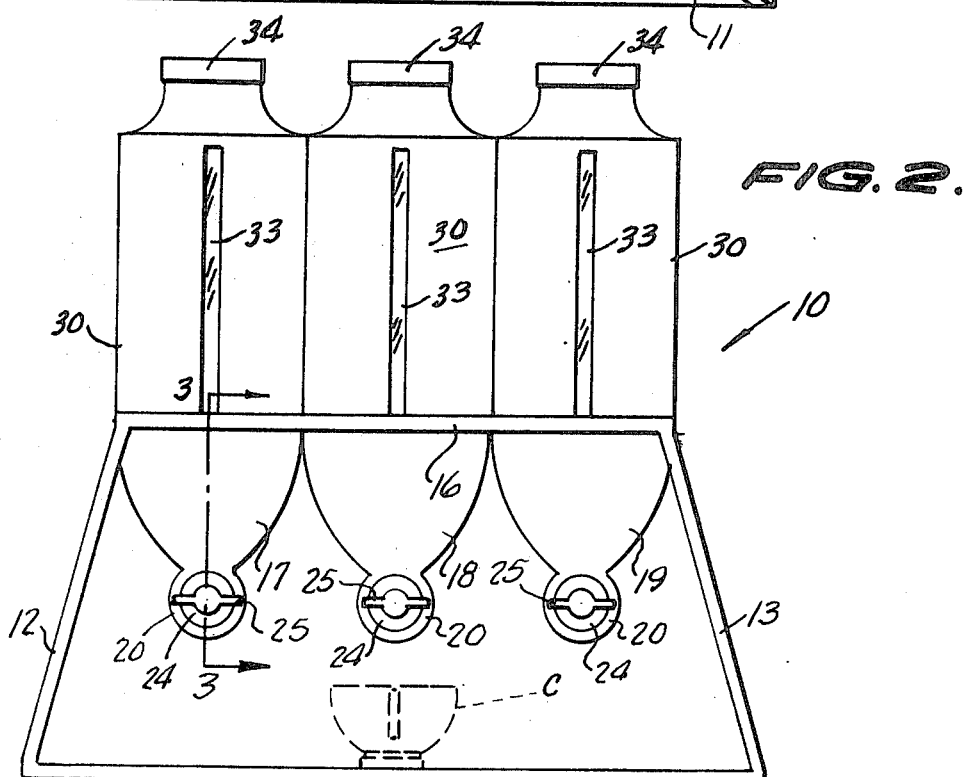
FIG. 2 is a front elevation of the invention.

Referring now to the drawings in detail wherein like reference characters indicate like parts throughout the several figures, the reference numeral 10 indicates generally a hopper dispenser unit constructed in accordance with the invention.

The hopper dispenser unit 10 includes a generally rectangular base plate 11 having inwardly and upwardly converging legs 12, 13, 14 and 15 joined to the four corners thereof. A generally rectangular horizontal frame 16 is integrally secured to the upper ends of the legs 12, 13, 14 and 15 and is arranged parallel to the base 11. A plurality of hopper bottoms 17, 18 and 19 are integrally formed with the frame 16 and depend therefrom toward the base 11 but spaced substantially thereabove.

Each of the hopper bottoms 17, 18 and 19 have a transversely extending generally cylindrical valve body 20 formed on its lower end with a dispensing opening 21 in the bottom side thereof. The valve body 20 is hollow communicating the hopper bottom 17 to the dispensing opening 21. A relatively large axial bore 22 extends substantially across the valve body 20 and has a substantially smaller bore 23 extending axially through the remainder of the valve body 20. A cylindrical valve 24 is mounted for rotation in the bore 22 and has a handle 25 formed on its outer end to permit the valve 24 to be rotated.

Figure 3:
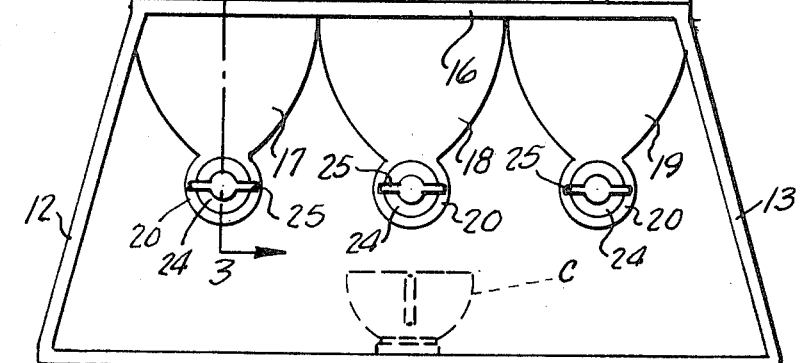
FIG. 3 is an enlarged fragmentary vertical sectional view taken along the line 3—3 of FIG. 2, looking in the direction of the arrows.
Figure 4:
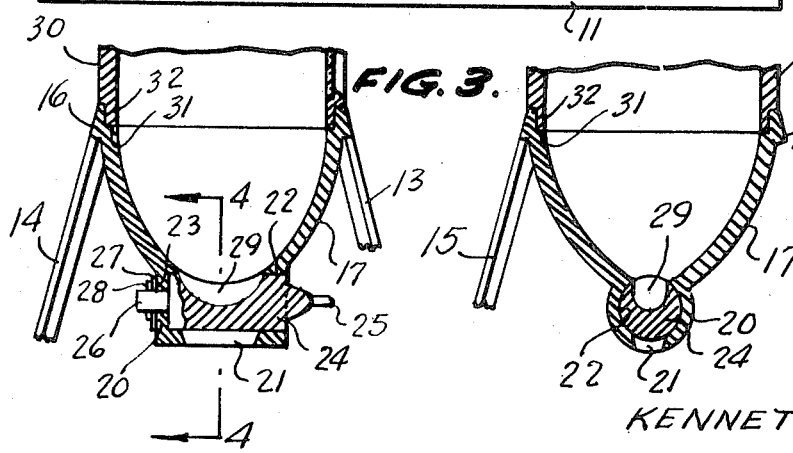
FIG. 4 is a fragmentary vertical sectional view taken along the line 4—4 of FIG. 3, looking in the direction of the arrows.

A stub shaft 26 is formed on the end of the valve 24 opposite the handle 25 to extend through the bore 23. A washer 27 is engaged over the shaft 26 and is secured thereon by a cotter key 28. A pocket 29 is formed in the valve 24 on one side thereof to receive powdered or granulated material from the hopper bottom 17 with the pocket 29 in the position illustrated in FIGS. 3 and 4. The valve 24 is then turned until the pocket 29 aligns with the dispensing opening 21 to dispense the contents of the pocket 29 while the valve 24 simultaneously shuts off flow of material from the hopper bottom 17.

A cylindrical hopper extension 30 is supported on each of the hopper bottoms 17, 18 and 19 and extends upwardly therefrom. The upper ends of the hopper bottoms 17, 18 and 19 are each provided with an annular recess 31 and the hopper extensions 30 are each provided with an annular flange 32 which is adapted to seat in the annular recess 31.

Each of the hopper extensions 30 have an elongate glass covered slot 33 extending vertically therein to provide visual means for determining the quantity of the contents thereof.

A removable cover 34 is provided for access to the hopper extensions 30 for filling of same.

In prior art practices powdered and granulated material such as coffee, cream, sugar and the like are normally stored in the sales containers and dispensed with a measuring spoon. Not only is this an awkward method to follow but additionally the measuring spoon can be filled to different levels changing the desired product considerably.

In the use and operation of the present invention, the powdered and granulated materials are placed in the hopper extensions 30 filling also the hopper bottoms 17, 18 and 19 and the covers 34 are placed thereon to retain the freshness of the products. A cup C is then placed beneath a dispensing opening 21 in one of the valve bodies 20 and the desired valve 24 is rotated to dispense the powdered or granulated material from the pocket 29. The cup then may be moved beneath a second and third dispensing opening 21 to complete the mixture for the beverage desired.

Having thus described the preferred embodiment of the invention, it should be understood that numerous structural modifications and adaptations might be resorted to without departing from the spirit of the invention.

What is claimed is:

1. A dispensing hopper unit comprising a generally horizontal, generally rectangular base, a plurality of legs extending upwardly from the corners of said base and converging inwardly, a generally rectangular frame arranged in vertically spaced parallel relation to said base and rigidly secured to the upper ends of said legs, a plurality of hollow hopper bottoms supported from said frame in depending relation thereto, said hopper bottoms having their lower ends spaced above said base, a cylindrical hopper extension seated on each of said hopper bottoms and projecting upwardly therefrom with the axes of said extensions arranged perpendicular to said base, a cover on each of said hopper extensions, means in the lower end of each of said hopper bottoms for manually dispensing a predetermined measured quantity of dry powder or granulated material therefrom comprising a generally cylindrical valve body integrally formed on the lower end of each of said hopper bottoms and extending transversely thereof with the axes of said valve bodies arranged in spaced parallel relation to each other and parallel to said base, each of said valve bodies having a dispensing opening in the lower side thereof, a rotary valve mounted in said valve body for dispensing material through said dispensing opening, said rotary valve having a single dispensing pocket formed therein for alternately aligning said hopper bottom and said dispensing opening, and means on said valve for releasably securing said valve in said valve body, and a handle formed on one end of said valve to provide means for manually rotating said valve for dispensing from said hopper.

* * * * *